(12) United States Patent
Zang et al.

(10) Patent No.: US 10,619,626 B2
(45) Date of Patent: Apr. 14, 2020

(54) BEARING UNIT

(71) Applicant: Aktiebolaget SKF, Gothenburg (SE)

(72) Inventors: Christian Zang, Nordheim (DE); Werner Horn, Schweinfurt (DE)

(73) Assignee: AKTIEBOLAGET SKF, Gothenberg (SE)

( * ) Notice: Subject to any disclaimer, the term of this patent is extended or adjusted under 35 U.S.C. 154(b) by 113 days.

(21) Appl. No.: 15/922,119

(22) Filed: Mar. 15, 2018

(65) Prior Publication Data

US 2018/0274523 A1 Sep. 27, 2018

(30) Foreign Application Priority Data

Mar. 27, 2017 (DE) .................. 10 2017 205 156

(51) Int. Cl.
| | | |
|---|---|---|
| *F16C 19/22* | (2006.01) | |
| *F03D 80/70* | (2016.01) | |
| *F16C 19/38* | (2006.01) | |
| *F16C 35/04* | (2006.01) | |
| *F16C 33/60* | (2006.01) | |
| *F16C 25/06* | (2006.01) | |
| *F16C 23/08* | (2006.01) | |

(52) U.S. Cl.
CPC ............ *F03D 80/70* (2016.05); *F16C 19/381* (2013.01); *F16C 19/385* (2013.01); *F16C 19/386* (2013.01); *F16C 25/06* (2013.01); *F16C 33/60* (2013.01); *F16C 35/042* (2013.01); *F16C 23/086* (2013.01); *F16C 2226/60* (2013.01); *F16C 2360/31* (2013.01); *Y02E 10/72* (2013.01)

(58) Field of Classification Search
CPC .... F16C 19/383; F16C 19/385; F16C 19/386; F16C 25/06; F16C 33/60; F16C 35/042; F16C 2229/00; F16C 2360/31
See application file for complete search history.

(56) References Cited

U.S. PATENT DOCUMENTS

| | | | | |
|---|---|---|---|---|
| 9,103,369 B2* | 8/2015 | Krug | ...................... | F16C 19/364 |
| 2003/0086631 A1* | 5/2003 | Faltus | ...................... | F16C 23/10 |
| | | | | 384/559 |
| 2011/0162174 A1* | 7/2011 | Liesegang | ............. | F16C 35/063 |
| | | | | 24/457 |
| 2013/0237370 A1* | 9/2013 | Smith | ................... | F16C 35/063 |
| | | | | 475/348 |

* cited by examiner

*Primary Examiner* — Phillip A Johnson
(74) *Attorney, Agent, or Firm* — Garcia-Zamor Intellectual Property Law, LLC; Ruy Garcia-Zamor; Bryan Peckjian

(57) ABSTRACT

A bearing unit having a rolling bearing providing a first ring element and a second ring element, and a plurality of rolling elements interposed in-between the first and the second ring elements such that the first and the second ring elements rotate relative each other in relation to a rotational axle. Further, the bearing unit including at least one support element that is at least partly embedding one of the first or the second ring element. The at least one support element provides an inner open geometry. The inner open geometry provides at least one structural elongated element that is designed for accommodating a load in the support element. The invention also provides a wind turbine main shaft arrangement having a bearing unit.

13 Claims, 2 Drawing Sheets

BEARING UNIT

CROSS-REFERENCE

This application claims priority to German patent application no. 102017205156.6 filed on Mar. 27, 2017, the contents of which are fully incorporated herein by reference.

TECHNOLOGICAL FIELD

According to a first aspect, the present invention relates to a bearing unit comprising a rolling bearing. According to a second aspect, the present invention relates to a wind turbine comprising a bearing unit according to the first aspect of the invention.

BACKGROUND

Rolling bearings are well known mechanical components which are used to rotatably support for example rotating shafts and the like. There are numerous types of rolling bearings available on the market, such as ball bearings and roller bearings of different designs. These bearing types can generally be used in many different applications, and some are more useful and designed for certain circumstances. Some rolling bearings are mainly designed to accommodate radial loads, some are mainly designed to accommodate axial loads and further some bearing types are designed to accommodate a combination of radial and axial loads. In addition, there are also bearing designs which are made to accommodate radial and axial loads, but also moment loads (e.g. yaw or bending moment loads). An example of a bearing that can accommodate radial, axial and moment loads is a double row tapered roller bearing that may present a split inner ring, a single outer ring and two rows of tapered roller elements interposed in-between the rings. Such a bearing may be designed with a so called O- or X-configuration, also known as a face-to-face or back-to-back configuration.

For rotating applications which are large in size and where there are high loads present, there is most likely a need for a bearing of a larger size, for example a bearing providing an outer diameter being larger than 0.5 meters. During operation of the bearing, when it is exposed of different types of loads (radial, axial and/or moment loads), the running performance may be affected negatively leading to a reduced service life of the bearing. One example of a demanding application which is large in size is a wind turbine. A wind turbine can be designed with different bearing configurations and arrangements. In one example, the wind turbine main shaft is supported by only one bearing, such as the double row tapered roller bearing which can accommodate axial, radial and moment loads, as mentioned above. Other examples of industries that uses rotating machinery which are large in size are mining, mineral processing, process industry, construction machines, marine, ocean energy etc. For applications comprising rolling bearings, there is most often a big advantage if the rolling bearings provide a long service life.

SUMMARY

In view of the above, an object of the present invention is to provide an improved bearing unit design that will lead to a longer bearing service life and which is better in handling the external loads which are exerted onto the rolling bearing. In addition, an object of the present invention is to provide an improved bearing unit design that alleviates at least one of the drawbacks of the prior art bearing designs.

The objects are achieved by the subject matter as specified in the independent claim. Preferred embodiments of the invention can be found in the dependent claims and in the accompanying description.

According to the first aspect thereof, the object is achieved by a bearing unit which comprises a rolling bearing providing a first ring element and a second ring element, and a plurality of rolling elements interposed in-between the first and the second ring elements such that the first and the second ring elements can rotate relative each other in relation to a rotational axle. Further, the bearing unit comprises at least one support element which is at least partly embedding one of the first or the second ring element, wherein the at least one support element provides an inner open geometry, and wherein the inner open geometry provides at least one structural elongated element which is designed for accommodating a load in the support element.

The design will lead to a more robust and stiff bearing unit design, which also will be light in weight compared to a bearing unit providing for example a solid supporting element without any open inner geometry. In addition, when the bearing unit is mounted into its application, deformations of surrounding mechanical elements (such as a hub of a wind turbine and/or a bearing housing) may not be transferred to the rolling bearing. Instead the support element of the bearing unit will accommodate such deformations (by the structural elongated element) and thereby the rolling bearing can continue to mainly operate in its nominal geometry (e.g. low ovalization of the bearing rings, reduced or no misalignment and/or twisting of the bearing rings). In addition, the rolling elements can rotate with undisturbed kinematics. This will lead to reduced wear of the bearing components and consequently a longer service life.

According to an embodiment, the inner open geometry of the at least one support element provides a plurality of structural elongated elements which are designed for accommodating a load in the support element.

According to an embodiment, the plurality of structural elongated elements are interconnected such that they create a truss for accommodating a load in the support element. A truss, also known as a framework, can be defined as a structure that comprises two-force elements only (e.g. structural elongated elements), where the elements are organized so that the assembly as a whole behaves as a single object. A two-force element is a structural component where force is applied to only two points. The elements may have any shape and can be connected in any stable configuration. According to an embodiment, the structural elongated elements of the truss comprise a plurality of triangular units constructed with straight elements whose ends are connected at joints which may be referred to as nodes. In this context, external forces and reactions to those forces are considered to act only at the nodes and result in forces in the members that are either tensile or compressive. For straight members, moments (torques) are explicitly excluded because all the joints in a truss are treated as revolutes, as is necessary for the links to be two-force members. According to another embodiment, the structural elongated elements of the truss comprise a plurality of square-shaped units, rectangular-shaped units, rhombus-shaped units, or any combination of any of the units. In general, the truss may optionally be designed with any one or a combination of right, acute or obtuse angles between the structural elongated elements.

According to an embodiment, the at least one support element is shaped as a ring. Optionally, the ring provides a square-shaped or rectangular-shaped cross section, wherein the cross section is represented by a plane in which the rotational axle of the bearing unit is present. Optionally, the at least one support element is a ring that provides an L-shaped or U-shaped cross section, wherein the cross section is represented by a plane in which the rotational axle of the bearing unit is present.

According to an embodiment, the inner open geometry is present in a portion of the circumference of the at least one support element. In another embodiment, the inner open geometry is present around the complete circumference of the at least one support element.

According to an embodiment, the bearing unit comprises at least one support element for the first ring element and at least one support element for the second ring element.

According to an embodiment, the bearing unit comprises at least two support elements which are at least partly embedding one of the first or the second ring element. Optionally, the at least two support elements may together form an L-shaped or U-shaped cross section, wherein the cross section is represented by a plane in which the rotational axle of the bearing unit is present. According to a further embodiment, the at least two support elements are connected to each other by at least one connecting means, such as a screw connection.

According to an embodiment, the bearing unit is arranged to be connected to an external mechanical element via at least one connecting means of the at least one support element. Optionally, the at least one connecting means of the at least one support element is a screw connection.

According to an embodiment, at least one of the first or the second ring element is a split ring element providing at least two separate rings. Optionally, the split ring element is embedded in the at least one support element, wherein the bearing unit provides a specific preload which has been created by tensioning the split rings together via the at least one support element. It has namely been realized by the inventors that it may be advantageous to set the preload of the bearing before the bearing is mounted into its intended application. By doing so, the likelihood of setting a non-satisfactory preload is reduced significantly. For example, the bearing unit's preload may be set already at the factory where the bearing unit is manufactured. This could be specifically advantageous for more demanding applications, such as wind turbines.

According to an embodiment, the rolling bearing is any one of:
  a roller bearing,
  a ball bearing,
  a moment bearing,
  a tapered roller bearing (TRB),
  a cylindrical roller bearing (CRB),
  a spherical roller bearing (SRB), or
  an angular contact roller bearing providing curved raceway profiles.

According to an embodiment, the rolling bearing is a double-row roller bearing arranged in an O- or X-configuration, also known as a face-to-face or back-to-back configuration.

According to an embodiment, the rolling bearing of the bearing unit is a large size rolling bearing. In an embodiment, the rolling bearing provides an outer diameter which is larger than 0.5 meters. The design of the at least one support structure may be especially advantageous for larger applications since the weight reduction will be more noticeable for larger components whilst it provides a high stiffness which thereby will reduce the risk that the rolling bearing does not operate within its nominal geometry as already explained hereinabove.

According to an embodiment, the bearing unit is a bearing unit for a wind turbine main rolling bearing, such as a double-row tapered roller bearing or a double-row angular contact roller bearing providing curved roller raceway surfaces. It has namely been realized by the inventors that such a light-weight and stiff design would be advantageous for a main bearing arrangement of a wind turbine.

According to an embodiment, the at least one support element is made of at least one of steel, iron or cast iron.

According to an embodiment, the at least one elongated support element provides a cross section along the longitudinal extension of the element that is circular shaped, oval-shaped, essentially square-shaped, I-shaped, H-shaped or any other shape. It is well known for the skilled person how to shape a pillar element in order for it to be strong and robust without the risk of e.g. buckling when a force is exerted onto the element.

According to the second aspect thereof, the object is achieved by a wind turbine main shaft arrangement which comprises a bearing unit according to any of embodiments of the first aspect of the present invention. It shall be noted that any embodiment of the second aspect of the invention is applicable and combinable to any of the embodiments of the first aspect of the invention and vice versa, unless specifically stated otherwise. The advantages of the second aspect of the invention are analogous to the advantages as presented in relation to the first aspect of the invention. More specifically, by providing a wind turbine main shaft arrangement, especially a wind turbine of larger size, with a bearing unit according to the first aspect of the invention, an increased service life of the main shaft arrangement in the wind turbine may be realized. This advantage may be especially noticeable in the case when the rolling bearing of the bearing unit in the wind turbine is a so called moment bearing, which is designed to accommodate radial, axial and moment loads. One example of such a moment bearing is the double row tapered roller bearing. In addition, the weight reduction and the increased stiffness of the unit may lead to an increased performance of the wind turbine The main shaft is arranged to carry a hub onto which a number of propeller blades are connected, such as e.g. three propeller blades. The main bearing unit is supported by a frame which in turn is connected to the nacelle of the wind turbine. The bearing unit is connected to the surrounding parts (e.g. hub and bearing housing) via the at least one support element. Both the inner ring and the outer ring may be embedded in at least one support element each, wherein the bearing unit may be connected by e.g. screws to the surrounding components. In an embodiment, the screws are connected to the surrounding components via axial bores in the support elements.

BRIEF DESCRIPTION OF THE DRAWINGS

Exemplifying and preferred embodiments of the present invention will now be described more in detail, with reference to the accompanying drawings, wherein.

Figure 1:
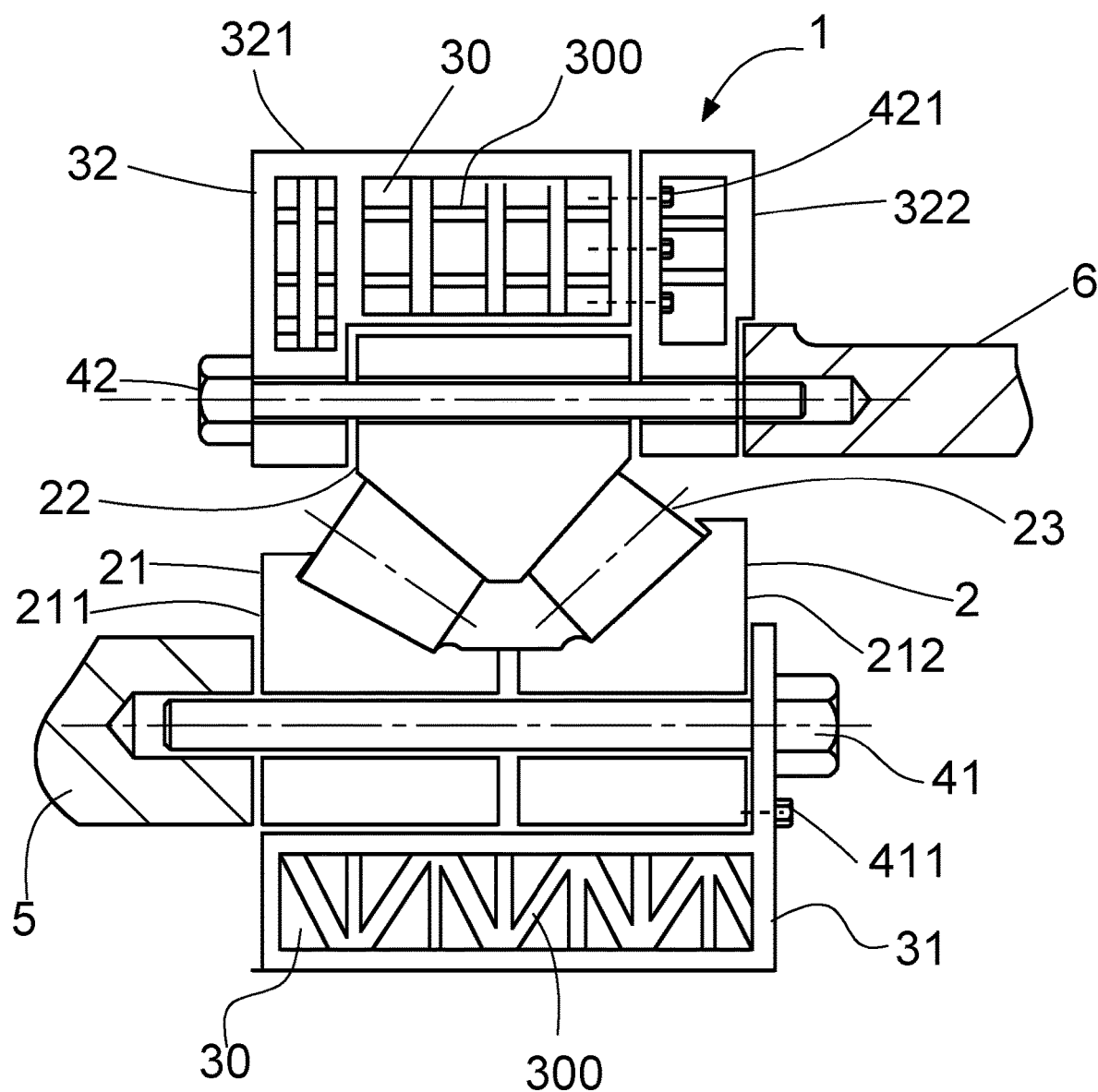
FIG. 1 shows a cross section of a bearing unit according to an embodiment of the first aspect of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

REFERENCE SIGNS

1 Bearing unit
2 Rolling bearing
21 First ring element
211 Ring element of first ring element
212 Ring element of first ring element
22 Second ring element
23 Rolling elements
31 Support element
32 Support element
321 Support element
322 Support element
30 Inner open geometry
300 Structural elongated element
41 Screw connection
411 Screw connection
42 Screw connection
421 Screw connection
5 External support structure
6 External support structure
100 Wind turbine
110 Hub
120 Wind turbine nacelle
130 Wind turbine tower

DETAILED DESCRIPTION

FIG. 1 illustrates a bearing unit 1 seen in an axial cross section which coincides with a rotational axle A, which bearing unit 1 comprises a rolling bearing 2 providing a first ring element 21 and a second ring element 22, and a plurality of rolling elements 23 interposed in-between the first and the second ring elements 21 and 22 respectively, such that the first and the second ring elements can rotate relative each other in relation to the rotational axle A. Further, the bearing unit 1 comprises two support elements, 31 and 32 respectively, which are at least partly embedding the first and the second respective ring elements, 21 and 22, wherein the support elements 31 and 32 present an inner open geometry 30, and wherein each one of the inner open geometries 30 present at least one structural elongated element 300 each, which are designed for accommodating a load in the support elements 31 and 32. In this embodiment, there are a plurality of structural elongated support elements 300 in both the support elements 31 and 32, wherein the support elements are arranged as a truss. The support element 32 for the second ring element 22 is encircling and embedding the ring element, and further the truss is arranged with a plurality of structural elements 300 which present right angles in-between the elements 300 as seen in the axial cross section of the bearing unit 1. Further, the support element 32 is in this embodiment divided into two elements, 321 and 322, which together are embedding and encircling the second ring element 22, and which further provides a U-shaped cross section. The two elements, 321 and 322, are connected by screws 421, but it is evident for the skilled person that also other types of connections are possible. The bearing unit 1 is connected to an external structure 6 (such as a frame of a wind turbine and/or a bearing housing) via screws 42 that are connecting the second ring element 22 and the support element 32 to the external structure 6. In this embodiment, the screws 42 are screwed into bores which are arranged essentially in the direction of the rotational axle A. Of course, there are also other types of possible connections. For the support element 31 for the first ring element 21, it is embedding and encircling the first ring element on the inner envelope surface of the ring 21. In this embodiment, the structural elongated elements 300, which are arranged as a truss, present acute angles in-between the elements 300 as seen in the axial cross section of the bearing unit 1. The truss arrangement can of course be designed in different ways, depending e.g. on the load situation of the current application. In addition, the support element 31 is in this embodiment providing an L-shaped cross section as seen along the rotational axle A, wherein the element 31 is connected to the ring 21 via screws 411, and further via screws 41 that connect the element 31 and the ring 21 to another external structure 5 (such as a hub of a wind turbine and/or a shaft). In this embodiment, the ring 21 is a split ring providing two separate rings 211 and 212 which are tightened together to thereby set a specific preload by the screws 41. In an embodiment, every second screw 41 may be used to set the preload of the rolling bearing 2 already prior to mounting the unit 1 into its intended application. For those screw connections, it may be enough to have bores that extends only such that the two ring elements, 211 and 212, are connected. In such a case, the other bores may be used to connect the unit 1 to the external structure 5 via the screws 41. As can be seen, in this embodiment the rolling bearing 2 is a double-row tapered roller bearing arranged in an X-arrangement. The bearing is a so called moment bearing which is designed such that it can accommodate radial, axial and moment loads. The first ring 21 is consequently an inner ring of the bearing 2, and the second ring 22 is an outer ring of the bearing 2. Other types of bearings are also possible as already described herein, such as for instance a double-row angular contact roller bearing that provides curved raceway profiles and barrel-shaped rollers. In an embodiment, the bearing is a so called angular contact self-aligning toroidal (or torus) bearing, also known as a SAT bearing.

Figure 2:
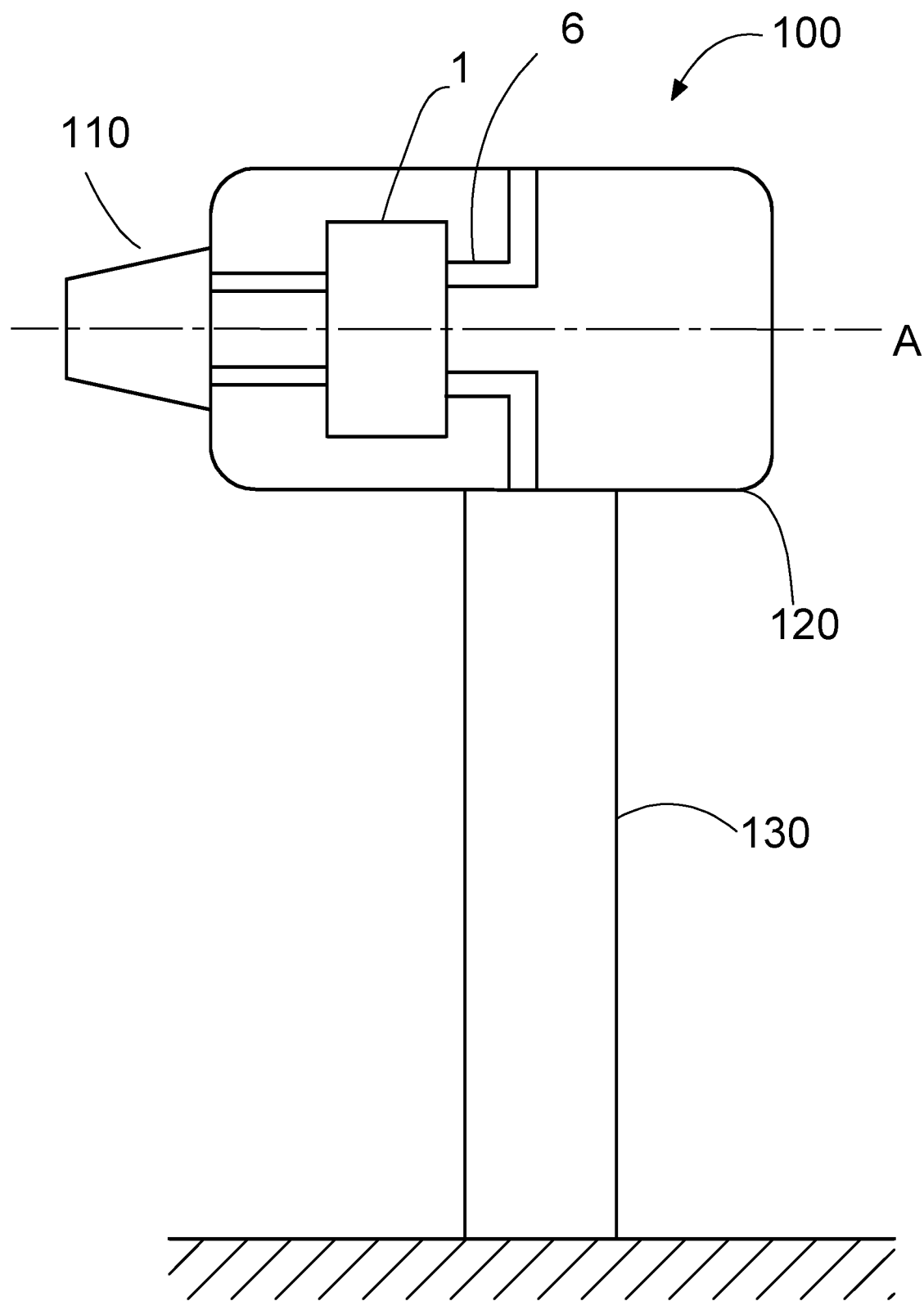
FIG. 2 shows a wind turbine according to an embodiment of the second aspect of the present invention.

In FIG. 2 an embodiment of a wind turbine 100 main shaft arrangement according to the second aspect of the invention can be seen. The wind turbine 100 comprises a bearing unit 1 according to any of the embodiments of the first aspect of the invention. In this embodiment, the bearing in the bearing unit 1 is a so called moment bearing that can accommodate radial, axial and moment loads. The bearing unit 1 is rotatably supporting a hub 110 onto which a number of propeller blades are connected (not shown). The bearing unit is supported and fixed to a frame 6 which in turn is connected to the wind turbine nacelle 120. The nacelle 120 is positioned onto a tower or pillar 130. The hub 110, the blades and the bearing unit 1 rotates around a rotational axle A, and consequently the energy created from the rotation is transferred into electricity by a generator (not shown). The wind turbine may be designed with a gear box, but it may also be designed without a gear box. Due to the design of the unit 1, the bearing will be working essentially in its nominal geometry during operation, and hence the service life of the bearing may be extended.

The invention is not limited to the embodiments described herein. It would be evident for the skilled person that other embodiments and modifications to the embodiments specified hereinabove are also possible within the scope of the claims. For example, the invention is not limited to only wind turbine applications. The skilled person will also recognize other possible applications in which the bearing unit could be advantageous.

What is claimed is:

1. A bearing unit, comprising,
a rolling bearing providing a first ring element and a second ring element, and a plurality of rolling elements interposed in-between the first and the second ring elements such that the first and the second ring elements rotate relative each other in relation to a rotational axle,
at least one support element that is at least partly embedding one of the first or the second ring element,
wherein the at least one support element provides an inner open geometry, and wherein the inner open geometry provides at least one structural elongated element being designed for accommodating a load in the support element.

2. The bearing unit according to claim 1, wherein the inner open geometry of the at least one support element provides a plurality of structural elongated elements that are configured for accommodating a load in the support element.

3. The bearing unit according to claim 2, wherein the plurality of structural elongated elements are interconnected such that they create a truss for accommodating the load in the support element.

4. The bearing unit according to claim 1, wherein the bearing unit further comprises at least one support element for the first ring element and at least one support element for the second ring element.

5. The bearing unit according to claim 1, wherein the bearing unit further comprises at least two support elements that are at least partly embedding one of the first or the second ring element.

6. The bearing unit according to claim 5, wherein the at least two support elements are connected to each other by at least one connecting means.

7. The bearing unit according to claim 1, further comprising the bearing unit being arranged to be connected to an external mechanical element via at least one connecting means of the at least one support element.

8. The bearing unit according to claim 7, wherein the at least one connecting means of the at least one support element is a screw connection.

9. The bearing unit according to claim 1, wherein at least one of the first or the second ring element is a split ring element providing at least two separate rings.

10. The bearing unit according to claim 9, wherein the split ring element is embedded in the at least one support element, and wherein the bearing unit further provides a specific preload that has been created by tensioning the split rings together via the at least one support element.

11. The bearing unit according to claim 1, wherein the rolling bearing is any one of:
a roller bearing,
a ball bearing,
a moment bearing,
a tapered roller bearing (TRB),
a cylindrical roller bearing (CRB),
a spherical roller bearing (SRB), or an angular contact roller bearing having curved raceway profiles.

12. The bearing unit according to claim 1, wherein the rolling bearing is a double-row roller bearing arranged in an O or X configuration.

13. A wind turbine main shaft arrangement comprising a bearing unit according to claim 1.

* * * * *